United States Patent

[11] 3,584,461

[72] Inventors Francis Debize
Pessac;
Jean-Jacques Henri Dussaut, Lormont;
Rene Theophile Albert Morin, Bordeaux-Cauderan, all of, France
[21] Appl. No. 879,099
[22] Filed Nov. 24, 1969
[45] Patented June 15, 1971
[73] Assignee Societe Europeenne De Propulsion
Puteaux, France
[32] Priority Nov. 25, 1968
[33] France
[31] 175,260

[54] GENERATOR OF HOT GASES USING HYBRID PROPELLANT
10 Claims, 2 Drawing Figs.
[52] U.S. Cl. ..................................................... 60/251, 60/220
[51] Int. Cl. ...................................................... F02k 9/04, F23r 1/16
[50] Field of Search .......................................... 60/251, 220, 219, 39.46, 39.47, 39.48

[56] References Cited
UNITED STATES PATENTS

| | | | |
|---|---|---|---|
| 2,984,973 | 5/1961 | Stegelman ..................... | 60/251 |
| 3,101,589 | 8/1963 | Hamrick et al. ............... | 60/220 |
| 3,166,898 | 1/1965 | Hoeptner ...................... | 60/39.47 |
| 3,298,182 | 1/1967 | Webb ........................... | 60/251 |
| 3,300,978 | 1/1967 | Pennington ................... | 60/251 X |
| 3,303,651 | 2/1967 | Grant, Jr. et al. ............. | 60/39.46 X |
| 3,315,472 | 4/1967 | Moutet et al. ................ | 60/251 |
| 3,368,353 | 2/1968 | Allport ......................... | 60/251X |
| 3,456,440 | 7/1969 | Keller ........................... | 60/39.48 |
| 3,488,950 | 1/1970 | Blackman et al. ............ | 60/39.46 |

Primary Examiner—Al Lawrence Smith
Attorney—William J. Daniel

ABSTRACT: A generator of hot gases employing hybrid propellant, more especially for a rocket-motor, and which includes an enclosure which terminates at one of its ends in a nozzle and in which there is accommodated a propellant in the solid phase and into which at least two injection devices have port, which devices each emit at least one jet of a propellant in the fluid phase able to enter into reaction with the propellant in the solid phase so as to produce a gaseous mass which escapes through the nozzle, wherein the enclosure is divided by a perforated partition or screen, arranged transversely to the general direction of flow of the gaseous mass, into an upstream space remote from the nozzle, in which space the entirety of the solid phase is accommodated in the form of a multitude of fragments, and into an unoccupied downstream space, one of the injection devices, or the primary injection device, having port in the upstream space while the other or secondary injection device has port in the downstream space.

GENERATOR OF HOT GASES USING HYBRID PROPELLANT

This invention relates to a generator of hot gases, more especially for rocket-motors, which for its operation employs hybrid propellant and which is of the type including an enclosure in which is accommodated a propellant in the solid phase and into which at least two injection devices have port, which devices emit at least one jet of a propellant in the fluid phase which is able to enter into reaction with the propellant in the solid phase so as to produce a gaseous mass which escapes through a nozzle.

As is already known, the employment of a solid monopropellant for the propulsion system of a rocket possesses, in spite of certain advantages of simplicity, more especially from the point of view of ease in storage and in transportation, several distinct drawbacks, such as; limited duration of burn, difficulties connected with cooling, and difficulties in regulating combustion and consequently the thrust. As regards fluid propellants, generally of liquid type, although they permit precise regulation of the thrust, they on the other hand necessitate delicate handling, especially when the use is concerned of cryogenic fluids, such as liquid hydrogen or oxygen, the employment of which involves awkward restrictions in manufacture, in transportation and in use.

For this reason the proposal has already been made to utilize, under the name of hybrid propellants, propellants made up of at least two independent components divided into two distinct phases, that is, a solid phase accommodated in the combustion chamber, and a fluid phase, generally liquid, which can be injected into the said chamber at an adjustable flow-rate.

These propellants simultaneously possess the advantages of solid propellants and those of liquid propellants, without having the drawbacks of the first-mentioned and while merely possessing, in comparison with the second-mentioned, disadvantages that are of reduced significance because of the decrease in the amount of fluid propellant involved.

However, experience has shown that gas-generators as utilized hitherto and involving hybrid propellant means possess certain inadequacies due, more especially, to the fact that the exothermic reactions occurring in the chamber are not always either sufficiently vigorous or complete. In this connection, it will be recalled that the reaction between the two phases takes place at a zone which is of a shallow kind and which is fixed by the shape and the dimensions of the mass constituting the solid propellant. When the latter is present in a monolithic form, for example, in the form of a "brick," its external surface-area, which alone is likely at a given instant to enter into reaction with the fluid propellant, is relatively small. Due to this fact, the prior intimate mixing of the two phases which is necessary in order to obtain a vigorous and complete reaction takes place only incompletely. The use of a solid propellant in the form of "brick" leads, in another connection, to difficulties in manufacture, if it be desired to prevent strains of disadvantageously large magnitude occurring in its midst during course of the reaction.

Finally, the fact that the mixing of the two phases and their mutual reaction takes place practically in the same location has the result that there is a considerable rise in the temperature of the "brick" and of its supporting structure, a factor which, as regards these materials, poses complex problems relating to thermal behavior.

The invention has for its object to provide a remedy for these various drawbacks; with this end in view, it proposes that the enclosure for the hot-gas generator be divided by a perforated partition or screen, arranged transversely to the general direction of flow of the gaseous mass, into an upstream space remote from the nozzle, in which space the entirely of the solid phase is accommodated in the form of a multiplicity of fragments, and an unoccupied downstream space, one of the injection devices or the primary injection device having port in the upstream space which the other or secondary injection device has port in the downstream space.

The fact that the solid phase is fragmented, for example into the form of small balls, pellets or other geometrical grains, instead of being present in the monolithic form, has the consequence that, for one and the same volume, its external surface area, in other words its surface in contact with the fluid phase, is considerably increased. The tier-type injection of the fluid phase, on either side of the perforated partition, for its part makes it possible to spread over two zones with differing characteristics the successive stages of the interaction phenomena occurring between the components of the propellant means. It thus emerges that the space located upstream of the perforated division forms a storage zone for the solid phase which ends, in the vicinity of the perforated partition, in a zone where the two phases mingle and where the reaction is initiated, the said zone possessing, as has been mentioned, a considerable surface area by reason of the fragmented structure of the solid phase. The amount of solid component volatilized in this zone is a function of the flow-rate and of the position of the pilot injection means. The space located downstream of the perforated partition on the other hand constitutes a reaction zone, properly so-called, in which the solid component, already volatilized and intimately mixed in the first zone with a fraction of the fluid component, reacts in a complete and vigorous manner with both fractions of the said fluid component. Due to the fact that the reaction between the two constituents is merely initiated in the upstream zone, the temperature prevailing in the said zone is moderate, a phenomenon which favors the thermal behavior of the supporting structure of the solid component, and in particular of the perforated partition, and also the behavior of the fragments of the said solid component which must not enter into the reaction until later. Finally, the fragmented structure of the solid component makes it possible in large measure to prevent dangerous strains from occurring in its midst during course of the reaction.

Each of the injection devices may conveniently comprise one or more injectors. According to a preferred embodiment of the invention, the primary injection device emits a jet in the direction of flow of the gaseous stream escaping from the generator. The secondary injection device will then preferably emit a counter jet running against the direction of the first flow, the two injection devices preferably being arranged to good advantage, on either side of the perforated partition, in such a manner that the jets of fluid-phase propellant emitted by the respective devices meet each other substantially level with the said partition. By this means, in the vicinity of the said partition, there is brought about a stabilizing effect favorable to obtaining a complete reaction.

In the case in which the enclosure is defined by a closed surface generated about an axis and in which at least one of the injection devices comprises an injector arranged substantially along the said axis, the said injector is mounted at such a distance from the partition that the cone formed by the jet of fluid-phase propellant escaping from the said injector has, for its base, the periphery of the said partition. In this way the occurrence of peripheral zones with an incomplete reaction is avoided.

A perforated partition or extra screen can be mounted, to good advantage, transversely to the general direction of flow of the gaseous mass, in the downstream space of the enclosure. The said screen, possessing a very fine mesh, has the effect of combating stratification in the mixture during reaction, this action homogenizing the reaction and accelerating its completion before the gases escape from the nozzle.

In another embodiment, which avoids the use of such an extra screen, the secondary injection device is made up of a series of injectors distributed over the wall of the converging section of the nozzle.

The following description referring to the accompanying drawings will indicate by way of nonlimitative example how the invention may be carried into practice.

Figure 1:
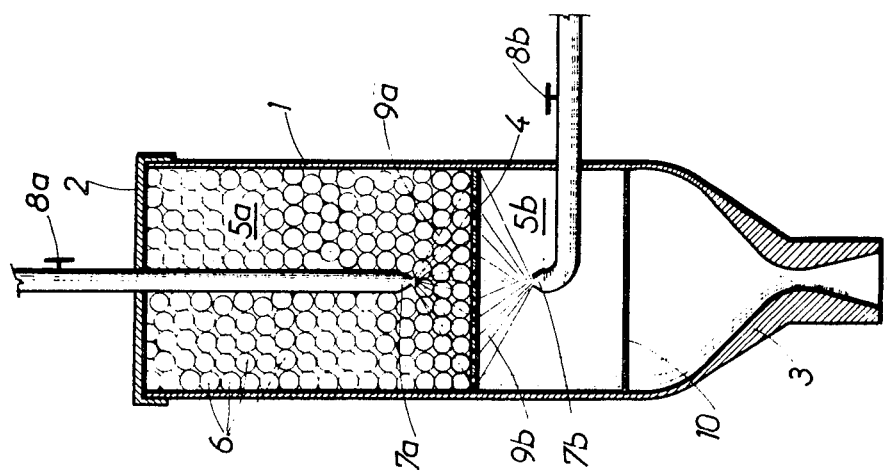
FIG. 1 shows, in axial section, a generator of hot gases employing hybrid propellant and forming part of the equipment, for example, of a rocket-motor. It is self-evident, however, that such an application is not limitative and that it would be possible, for example, to employ the gases produced by the said generator to drive a turbine round, to vaporize a liquid or to eject a liquid from a tank.

In FIG. 1, the reference 1 denotes a casing, for example of cylindrical shape and closed at one of its ends by a cover 2, and terminating at its other end in a nozzle 3. The said casing bounds an enclosure divided by a transverse perforated partition or screen 4 into an upstream space 5a and a downstream space 5b. The upstream space 5a constitutes a chamber in which a solid-phase propellant, supported and held in place by the screen 4, is accommodated. The said propellant is present in the form of fragments, for example small balls 6 of a few millimeters in diameter, these filling the space 5a between the cover 2 and the perforated retaining partition or screen 4. The holes or meshes of the latter are so calibrated as to distribute the gases in the cone or cones formed by a pilot injection device. In contrast to the upstream space 5a, the downstream space 5b is unoccupied.

A primary injection device made up, in the example shown, of an injector 7a arranged along the axis of the enclosure and controlled by a valve 8a, makes it possible to emit axially into the upstream space 5a at least one jet of fluid-phase propellant. As the drawing shows, the injector 7a is to some extent buried in the fragmented solid phase 6. It is directed in such a way as to emit a jet in the general direction of flow of the gaseous mass escaping during operation from the generator, and it has port at such a distance from the perforated partition or screen 4 that its cone of injection 9a has the periphery of the said screen for its base. All the fragments or balls 6 of solid-phase propellant located within the said cone are therefore impinged on, during operation, by the propellant injected in the fluid phase and by the gases resulting from the initial reactions.

On the other side of the perforated partition or screen 4, there has port in the unoccupied downstream space 5b a secondary injection device likewise made up, in the example shown, of an injector 7b arranged along the axis of the enclosure and controlled by a valve 8b. The said injector is directed in such a way as to emit a jet axially in a direction opposite to that from the injector 7a and, like the latter, it has port at such a distance from the perforated partition or screen 4 that its cone of injection 9b has the periphery of the said screen for its base, the two jets of propellant in the fluid phase emitted by the two injectors 7a and 7b respectively, thus meeting each other substantially level with the perforated partition or screen 4.

An extra perforated partition or transverse screen 10 may be arranged in the downstream space, between the screen 4 and the nozzle 3.

The solid-phase propellant possesses a composition such that the said state is feasible both at an ordinary temperature and at that at which the propellant is consumed. With this end in view, it is possible to employ suitable additives or binders. The propellant may consist of one or more chemical substances with the features of a fuel, for example substances with an amine base, the propellant in the fluid phase being then formed from one or more substances with the features of an oxidizer, hence, for example, from a mixture of concentrated nitric acid and of nitrogen peroxide (the normal hybrid), but is equally possible to operate with a reversed hybrid in which the fuel is in the liquid phase and the oxidizer is in the solid phase, or even in given cases with a mixed hybrid, in which the oxidizer and the fuel are split up between the two phases. In the case of a normal or reverse hybrid, the two propellants preferably together constitute a hypergolic system.

During operation, the fluid-phase propellant emitted from the primary injector 7a reacts with the fragments 6 of the propellant in the solid phase located within the cone of injection 9a, the contacting surface between the two propellants being very considerable relatively to the volume concerned, due to the fact that the solid-phase propellant is in a fragmented state. The flow-rate of the fluid-phase propellant injected at this level is fixed in such a way that the reaction between the two propellants, though it is incomplete, brings about a rise in temperature sufficient gradually to volatilize the fragments or balls 6 located within the cone 9a, other fragments or balls originating in the upstream space 5a migrating progressively to replace those that have been volatilized.

The reaction thus started up supplies a gaseous mixture which is very rich in constituents originating from the propellant in the solid phase, and which has a relatively low temperature, due to the fact that the reaction in the zone under consideration has only just commenced. This moderate value for the temperature favors the thermal behavior of the perforated partition or screen 4 which forms one element of the structure supporting the propellant in the solid phase, and likewise the behavior of the fragments or balls 6 that are located outside the cone of injection 9a and which only enter into reaction later. This moderate temperature, along with the fact that the solid-phase propellant possesses a fragmented structure, also makes it possible to prevent the occurrence in its midst of dangerous strains during operation.

The gaseous mixture so formed passes through the screen 4 and penetrates into the downstream space 5b, where it comes into contact with the main flow of propellant in the fluid phase from the secondary injector 7b. Due to the intimate mixing of the reactive constituents, the reaction started up in the upstream space then proceeds in a vigorous and complete manner in the downstream space; the temperature therefore rises greatly.

The arrangement of the two injectors 7a—7b with jets running counter to each other also contributes to the creation, in the vicinity of the perforated partition or screen 4, of a stabilization zone favorable to obtaining a complete reaction. It will also be noticed that, as the cones of injection 9a—9b possess for their base the periphery of the perforated partition 4, it is possible for the jets of fluid-phase propellant to operate over the entire cross section of the enclosure, thus preventing the occurrence of peripheral zones with incomplete reaction.

The two valves 8a and 8b make it possible to adjust the supply of the fluid-phase propellant so as to obtain the desired flow-rate of gas, which may vary in course of operation, and optimum richness. These two valves may be either operated independently or linked to each other by appropriate control means.

If the generator is operating in a single mode, these two valves may be replaced by diaphragms which distribute the total flow of fluid propellant between the primary and the secondary injection means, a single valve at the outlet from the tank controlling the startup or stopping of the generator.

The perforated partition or extra screen 10 constitutes a swirl-imparting device intended to homogenize and to accelerate the reaction by destroying the stratification of the mixture in the course of reaction. The chemical reaction between the two propellants is practically at an end before the gases escape from the nozzle 3.

Figure 2:
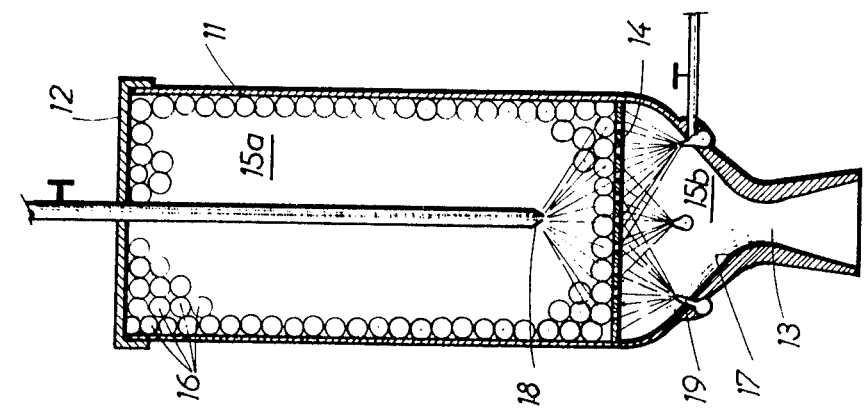
FIG. 2 is a view, in axial section, of another embodiment of a generator of hot gases employing hybrid propellant in accordance with the invention.

FIG. 2 shows in axial section another embodiment of a generator of hot gases employing hybrid propellant means in accordance with the invention, which embodiment makes it possible to eliminate the swirl-imparting device.

As in the case of FIG. 1, the said generator includes a cylindrical casing 11 closed at one of its ends by a cover 12 and terminating at its other end in a nozzle 13. The casing 11 bounds an enclosure which is divided by a perforated transverse partition or screen 14 into an upstream space 15a, in which the fragmented solid-phase propellant 16 (only partially shown) is accommodated, and an unoccupied downstream space 15b, again bounded by a part 17 which forms the convergent portion of the nozzle 13. The primary injection device for the fluid-phase propellant is also composed, in this example, of an injector 18 arranged axially and having port at such a distance from the perforated partition or screen 14 that its cone of injection has the periphery of the said screen for its base.

In the example shown, the secondary injection device is composed of a series of injectors 19 distributed over the wall of the convergent portion 17. This distribution, as also the selection of the angles of dispersion relating to these injectors, are fixed in such a way that the cones formed by the jets of fluid-phase propellant leaving the injectors cover a surface area substantially matching that of the screen 14. In this way, the direction of the gas flow at the exit from the screen is modified and follows spiralling trajectories which ensure a homogeneous mixture by creating a "stirring" effect. A further advantage of this embodiment is that it permits a considerable reduction in the volume of the combustion chamber.

The arrangements described make it possible to increase the efficiency of the generator and to obtain, in the case of rocket-motors, a specific thrust which is greater than in the case of conventional installations employing hybrid propellant means.

It is apparent that the embodiments described are only examples and can be modified in various ways within the scope of the invention, as defined by the appended claims.

Thus, for example, it may prove advantageous, more especially in the case of a propulsion unit of large diameter, to replace the primary axial injector by injectors placed around the periphery and arranged in such a way that the totality of the cones formed by the jets of fluid-phase propellant leaving the injectors covers a surface area matching that of the screen. It may likewise prove useful to combine into a single injection device peripheral injectors together with an axial injector.

We claim:

1. A generator of hot gases employing hybrid propellant, for example for rocket-motors, comprising:
   a casing forming an enclosure;
   a nozzle terminating the downstream end of the enclosure;
   a perforated partition dividing the enclosure into an upstream space and a downstream space;
   solid-phase propellant in fragmentary form accommodated in the upstream space, the downstream space being unoccupied;
   an injection device for fluid-phase propellant having port into the upstream space, and
   a second injection device for fluid-phase propellant having port into the downstream space.

2. A generator according to claim 1, wherein each of the injection devices comprises at least one injector.

3. A generator according to claim 1, wherein the first injection device emits a jet in the direction of flow of the gaseous mass escaping from the generator.

4. A generator according to claim 1, wherein the second injection device emits a counterjet running against the direction of flow of the gaseous mass escaping from the generator.

5. A generator according to claim 1, wherein the two injection devices are arranged in such a way on either side of the perforated partition that the jets of fluid-phase propellant emitted by either of the said devices meet each other substantially level with the said partition.

6. A generator according to claim 1, wherein the casing comprises a wall defining a surface generated about an axis and the perforated partition lies transverse to said axis, and including means mounting at least one of fluid-phase propellant injection on said axis to direct a cone of propellant towards said partition with the base of the propellant cone corresponding to the partition periphery.

7. A generator according to claim 1, wherein the fragments of solid propellant have the form of small balls or pellets.

8. A generator according to claim 1, including means for adjusting the feed of fluid-phase propellant to the injection devices.

9. A generator according to claim 1, wherein an additional perforated partition or screen is arranged in the downstream space of the enclosure transversely to the general direction of flow of the gaseous mass.

10. A generator according to claim 1, wherein the second injection device includes a series of injectors distributed over the wall of the convergent portion of the nozzle.